(12) United States Patent
Shaibani et al.

(10) Patent No.: US 7,130,506 B2
(45) Date of Patent: Oct. 31, 2006

(54) COMPENSATING INTERFEROMETER WITH BRAGG REFLECTORS

(75) Inventors: Sanan Shaibani, Woodland Hills, CA (US); Joseph Krystkowiak, Moorpark, CA (US); John Mansell, Thousand Oaks, CA (US); Akbar Arab-Sadeghabadi, Simi Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/012,398

(22) Filed: Dec. 15, 2004

(65) Prior Publication Data

US 2006/0127005 A1 Jun. 15, 2006

(51) Int. Cl.
*G02B 6/34* (2006.01)
(52) U.S. Cl. .......................................................... 385/37
(58) Field of Classification Search ...................... None
See application file for complete search history.

(56) References Cited

U.S. PATENT DOCUMENTS

| 4,697,926 | A | * | 10/1987 | Youngquist et al. | 356/478 |
|---|---|---|---|---|---|
| 4,770,535 | A | * | 9/1988 | Kim et al. | 356/478 |
| 5,740,290 | A | * | 4/1998 | Byron | 385/27 |
| 5,987,197 | A | * | 11/1999 | Kersey | 385/24 |
| 5,991,026 | A | * | 11/1999 | Kluth et al. | 356/478 |
| 6,278,823 | B1 | * | 8/2001 | Goldner et al. | 385/100 |
| 6,493,088 | B1 | * | 12/2002 | Hui et al. | 356/450 |
| 6,591,025 | B1 | * | 7/2003 | Siems et al. | 385/12 |
| 2001/0048071 | A1 | | 12/2001 | Holtz et al. | |
| 2003/0025912 | A1 | * | 2/2003 | Hui et al. | 356/477 |
| 2003/0031404 | A1 | | 2/2003 | Pederson | |
| 2004/0207902 | A1 | | 10/2004 | Koch et al. | |
| 2004/0213501 | A1 | | 10/2004 | Chi et al. | |

* cited by examiner

*Primary Examiner*—Michelle Connelly-Cushwa
*Assistant Examiner*—Chris Chu

(57) ABSTRACT

Methods and apparatus for generating an optical waveform by distributing an input optical waveform among a plurality of environmentally isolated legs wherein each leg comprises a Bragg grating and contributes to the generated optical waveform by using the Bragg grating to reflect back at least a portion of light distributed to the leg.

14 Claims, 3 Drawing Sheets

COMPENSATING INTERFEROMETER WITH BRAGG REFLECTORS

FIELD OF THE INVENTION

The present invention relates generally to compensating interferometers, and more particularly to compensating interferometers used to manipulate light signals output by optical sensor arrays.

BACKGROUND OF THE INVENTION

In some instances it is beneficial to utilize an apparatus comprising a compensating interferometer that modulates the phase of an input light signal to produce an output signal that is a superposition of an input signal and a phase shifted version of the input signal. One such instance is when a compensating interferometer is used to manipulate the output of a sensor array as described in U.S. Pat. No. 5,987,197. However, known compensating interferometers lack functionality that can be advantageous in processing optical signals.

SUMMARY OF THE INVENTION

The present invention is directed to methods and apparatus for generating an optical waveform by distributing an input optical waveform among a plurality of environmentally isolated legs, wherein each leg comprises a Bragg grating and contributes to the generated optical waveform by using the Bragg grating to reflect back at least a portion of light distributed to the leg.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the Figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

The apparatus and methods described herein provide means for generating and/or modifying input optical pulse trains or other optical waveforms, and/or means for cleaning up or filtering input optical waveforms. More particularly, some embodiments are apparatus that utilize multiple environmentally isolated internal paths and Bragg gratings to form one or more desired waveforms from one or more input wave forms. As an example of one embodiment, if an optical pulse train is input into one such apparatus, a single input pulse of the pulse train is split into two output pulses separated in time and having a fraction of the energy of the input pulse, but otherwise being substantially similar to the input pulse. As an example of another embodiment, a series of high energy broad band pulses input into an apparatus are manipulated so as to generate a desired waveform that differs substantially from the input waveform. Other examples of apparatus and methods which can advantageously be combined with the apparatus and methods described herein are found in the inventors' co-pending U.S. patent application Ser. No. 11/012,850, which is titled "Compensating Interferometer Including Delay Lines With Reduced Noise," filed Dec. 15, 2005 and herein incorporated by reference in its entirety.

Figure 1:
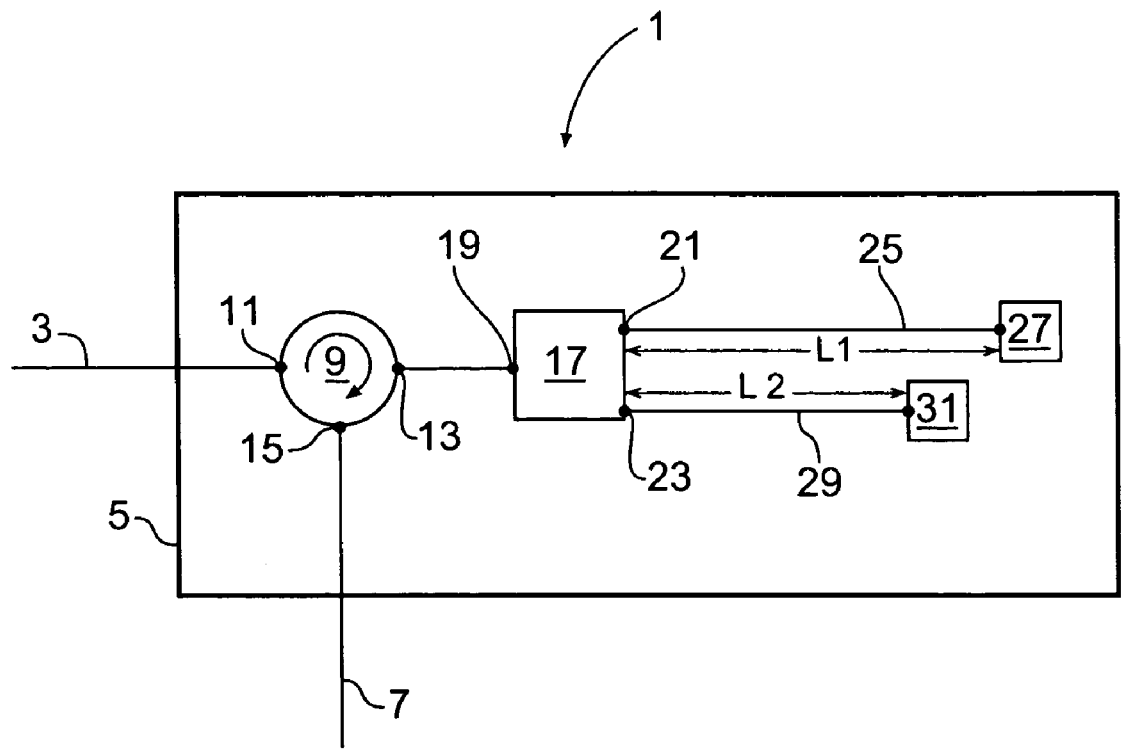
FIG. 1 is schematic view of a first compensating interferometer in accordance with an instance of an embodiment of the invention.

FIG. 1 provides a schematic view of an apparatus 1 including an input optical fiber 3, a body 5 and an output optical fiber 7. The input optical fiber 3 is optically coupled to the first port 11 of a three port circulator 9, and the output optical fiber 7 to the third port 15 of the optical circulator 9. The second port 13 of the optical circulator 9 is optically coupled to an optical splitter 17. The optical splitter 17 includes three ports 19, 21, and 23, wherein light traveling into the splitter 17 through the port 19 is split between the ports 21 and 23, and light traveling into the splitter 17 through the ports 21 and 23 is combined and exits the splitter 17 via the port 19 and subsequently exits the apparatus 1 via the third port 15 of the circulator 9 and the output optical fiber 7. The ports 21 and 23 are each connected to a length of optical fiber (25, 29) with each length of optical fiber (25, 29) comprising one or more fiber Bragg gratings (27, 31). The port 21 is connected to the optical fiber 25 comprising the fiber Bragg grating (FBG) 27, and the port 23 is coupled to the optical fiber 29 comprising the FBG 31. The length L1 of the optical fiber 25 is substantially longer than the length L2 of the optical fiber 29, where L1 is the distance between the point at which light entering the splitter 17 is split and the point at which the FBG 27 reflects all or some of the light in the optical fiber 25, and L2 is the distance between similar points in the optical fiber 29.

Figure 2:
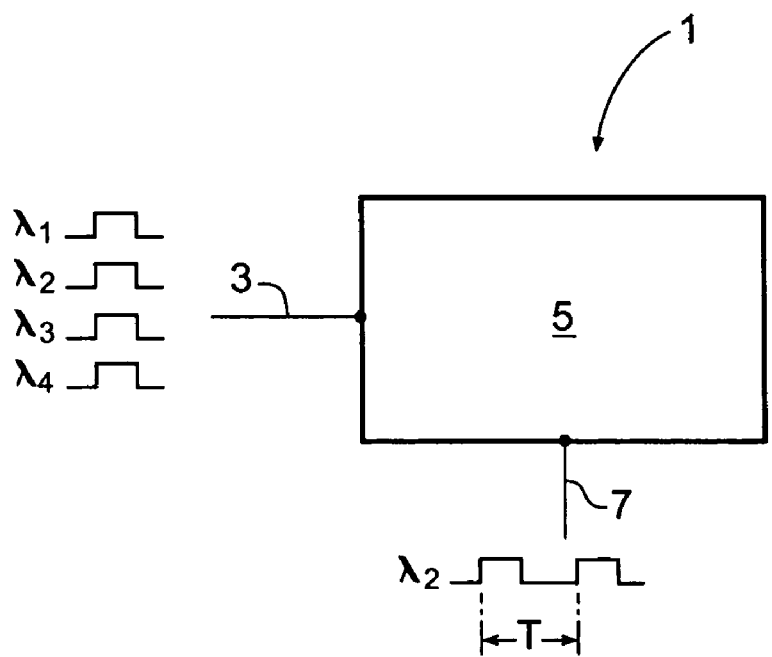
FIG. 2 is schematic view illustrating a use of the apparatus of FIG. 1.

Having the lengths L1 and L2 differ causes a delay between the contributions made by each FBG (27, 31) such that light reflected by the FBG 27 is added to the light output via the optical fiber 7 is delayed relative to light reflected by the FBG 31. Moreover, the FBGs 27 and 31 can be used to reflect only a portion of the input light. This is illustrated in FIG. 2 wherein a pulse including wavelengths $\lambda_1, \lambda_2, \lambda_3,$ and $\lambda_4$ is converted into two pulses of wavelength $\lambda_2$ separated by a time T where T is a function of difference between L1 and L2. If the distance between L1 and L2 is increased, T increase. The output waveform comprises pulses of wavelength $\lambda_2$ as both FBG 27 and FBG 31 reflect wavelength $\lambda_2$.

For clarity, each combination of optical fiber and FBG that provides a separate contribution to the light output on the optical fiber 7 can be referred to as a "leg". As such, the apparatus 1 of FIG. 1 includes two separate optical legs with one leg including the optical fiber 25 and the FBG 27, and another leg including the optical fiber 29 and the FBG 31.

Figure 3:
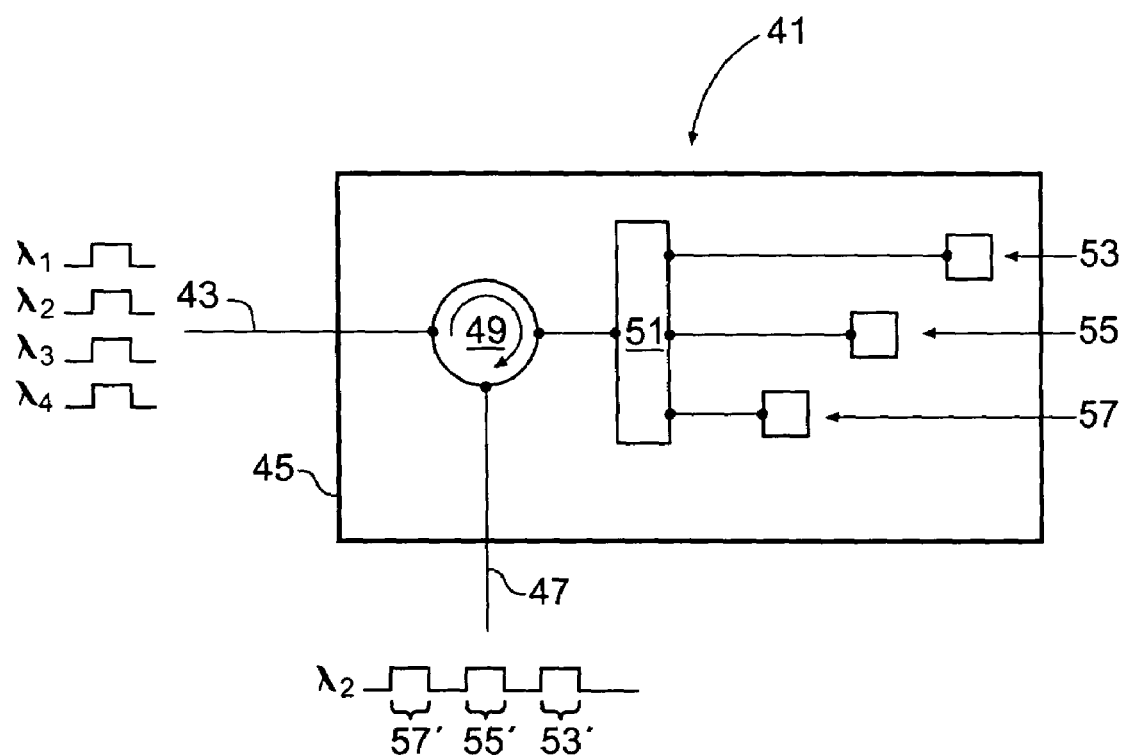
FIG. 3 is a schematic view of a second compensating interferometer in accordance with an instance of an embodiment of the invention.

Although the apparatus 1 is shown with two optical legs, it is contemplated that the number of optical legs may vary between embodiments depending on the output waveform desired and how many optical legs are needed to produce such a waveform. In regard to pulse trains, the number of optical legs, in some instances, corresponds to the number of pulses to be output for each input pulse. As such, if four output pulses are desired for each input pulse, four optical legs may be used. If eight pulses are desired, then eight optical legs may be used. In FIG. 3, an apparatus 41 includes an input optical fiber 43, a body 45, an output optical fiber 47, a circulator 49, a splitter 51, and optical legs 53, 55, and 57. As can be seen, the apparatus 41 includes three optical legs and as such, can produce three separate output pulses (57', 55', and 53') for each input pulse. As with the apparatus 1 of FIG. 1, the spacing of the pulses can be controlled by controlling the differences in the lengths of the optical legs 53, 55 and 57.

Figure 4:
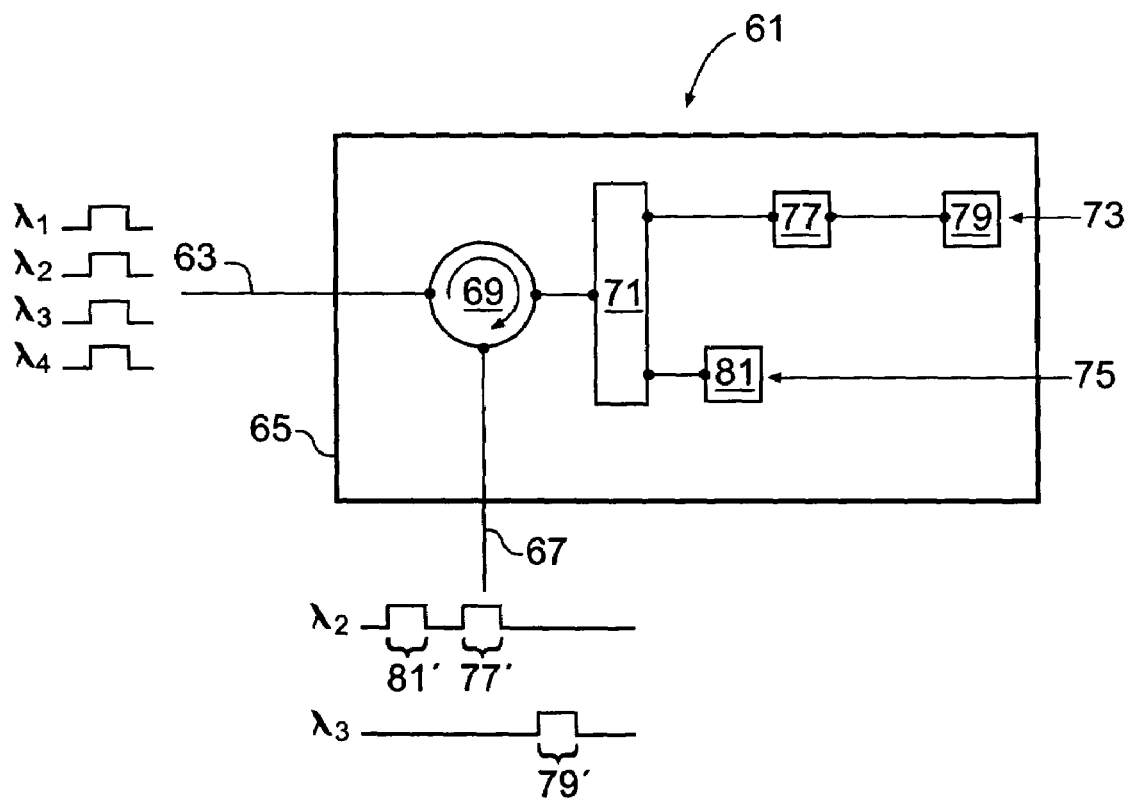
FIG. 4 is a schematic view of a third compensating interferometer in accordance with an instance of an embodiment of the invention.

In addition to varying the number of optical legs, it is possible to vary the number of FBGs per leg. Increasing the number of FBGs in a leg permits reflection of a greater number of wavelengths by that leg. Moreover, relative positioning of the FBGs on a leg can be used to adjust the timing of the light contributed by each FBG. In FIG. 4, an apparatus 61 includes an input optical fiber 63, a body 65, an output optical fiber 67, a circulator 69, a splitter 71, and optical legs 73 and 75. The leg 73 includes two FBGs, 77 and 79, and the leg 75 includes just the one FBG 81. The FBGs 77 and 81 reflect wavelength $\lambda_2$ and the FBG 79 reflects the wavelength $\lambda_3$. As such, an input pulse that includes wavelengths $\lambda_1, \lambda_2, \lambda_3,$ and $\lambda_4$, produces an output comprising three pulses (77', 79', and 81') corresponding to the three FBGs (77, 79, and 81) separated in time on wavelengths $\lambda_2$ and $\lambda_3$. As with the apparatus of FIGS. 1 and 2, the spacing of the pulses is determined at least in part by the relative distance traveled by light contributing to each pulse and as such is determined at least partially by the position of the FBGs in each leg. In addition to reflecting a greater number of wavelengths, using multiple FBGs in a leg can increase the number of pulses returned for a single wavelength if initially encountered FBGs are not fully reflective.

In addition to varying the number of legs, and/or the number of FBGs in each leg, one can also vary the center wavelength, bandwidth, and/or reflectivity of individual FBGs. As an example, the output waveform for $\lambda_2$ in FIG. 4 could be formed using only leg 73 with FBG 77 and 79 having the same center wavelength, and FBG 77 not being fully reflective.

The types of reflectors used may also be varied such that non-FBG reflectors are included. As an example, a fully reflective broadband mirror could be placed at the end of a leg to reflect any light not reflected by FBGs positioned between the mirror and the splitter directing light into the leg.

The manner of splitting light between optical legs may also vary between embodiments. As such, some embodiments may have an a number of output pulses for each input pulse that is a power of two, and have a binary tree type of splitter arrangement. In other instances non-symmetrical splitter arrangements may be used, as might be splitters that split light three or more ways. Moreover, some embodiments may unevenly distribute light between optical legs such that at least one leg receives a higher percentage of the light being split than another leg. In some instances, light may be split between at least some optical legs based on frequency utilizing a WDM as the splitter. As an example, the splitter 17 of FIG. 1, 51 of FIG. 3, and/or 71 of FIG. 4 may comprise a WDM such that different frequencies are directed down different legs. It is contemplated that having different frequencies travel over different legs will reduce the amount of coherent noise added by the apparatus to the output signal.

Some embodiments may include more than one input and/or more than one output. In such instances, individual inputs may have corresponding outputs that are independent of any other inputs and outputs. One mechanism for achieving such independence is to combine two apparatus such as the apparatus 1 of FIG. 1 and the apparatus 41 of FIG. 3 in a single body. In other instances, inputs may be combined to generate one or more outputs. As such, inputs and outputs may be mixed and matched in any manner that produces the desired outputs.

Although the apparatus shown utilize a circulator in combination with a splitter for internal routings, any suitable internal routing mechanism may be used. As such, some embodiments may include a coupler or a wave division multiplexer (WDM). If a coupler is used, it may in some instances be a fused fiber coupler.

Although the apparatus shown include optical fibers, any other form(s) of optical waveguide(s) may be used to replace any single optical fiber or combination of the optical fibers described herein with corresponding changes being made to any other components affected.

Although shown with inputs suitable for being spliced to other optical fibers, the inputs and/or outputs may be replaced with any other optical connection mechanism that facilitates use of the apparatus. Some such mechanisms include but are not limited to optical colimaters or other lensing mechanism, non-fiber optical waveguides, and/or free space. Moreover, any inputs and/or outputs may be connected to one or more filters, isolators, and/or attenuators to provide additional control over the input and/or output light.

Although shown in a single housing/body, different embodiments may utilize multiple housings, or no housings at all. In some embodiments, however, housings 5, 45, and 65 will include mechanical protection for the device including pressure, thermal, vibration and other control packaging to isolate components from environmental changes occurring outside the housing/body. The term "environmentally isolated" is used herein to describe components positioned within a body or other packaging that isolates them from environmental changes. As such, the legs of FIGS. 1, 3, and 4 are environmentally isolated because they are positioned within housings 5, 45 and 65. Although the size, dimensions, and construction of housings will likely vary between embodiments, it is contemplated that in many instances it will be advantageous to have a housing that would fit within a sphere having a diameter of D meters where D is one of 1, 0.5, and 0.25.

The apparatus described herein has particular application when used in conjunction with an input light source that is located substantially far from the apparatus. As an example, a light source comprising a broad band source or one with a narrow band laser source may be coupled to an apparatus, such as apparatus 1, by an optical fiber that covers an optical distance of 10 meters to 100 km, and/or where the time of flight is at least 100 ns.

In one such application, a compensating interferometer (CI) as described herein can be used to tune pulses provided by the light source where the CI is located kilometers from the light source. If the light source transmits a pulse of laser light down a connecting fiber to a destination system, the connecting fiber will add coherent noise to the transmitted pulse and, if a CI is not used, degrade the performance of the destination system that the pulse is being transmitted to. By placing a CI next to the destination system, the CI can be used to reduce, and in some cases eliminate, the coherent noise added by the connecting fiber. Additionally, the CI can also be used to provide additional control over light entering the destination system such that the number of pulses and the shape of the input optical waveform is better suited for use by the destination system than the light received by the CI.

Figure 5:
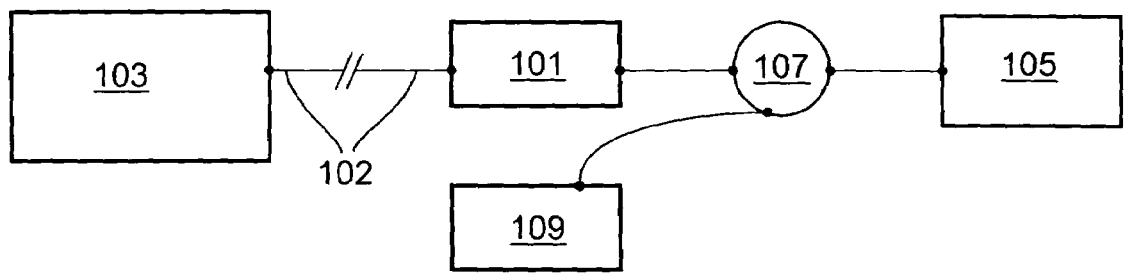
FIG. 5 is a schematic view of a first system comprising a compensating interferometer in accordance with an instance of an embodiment of the invention.
Figure 6:
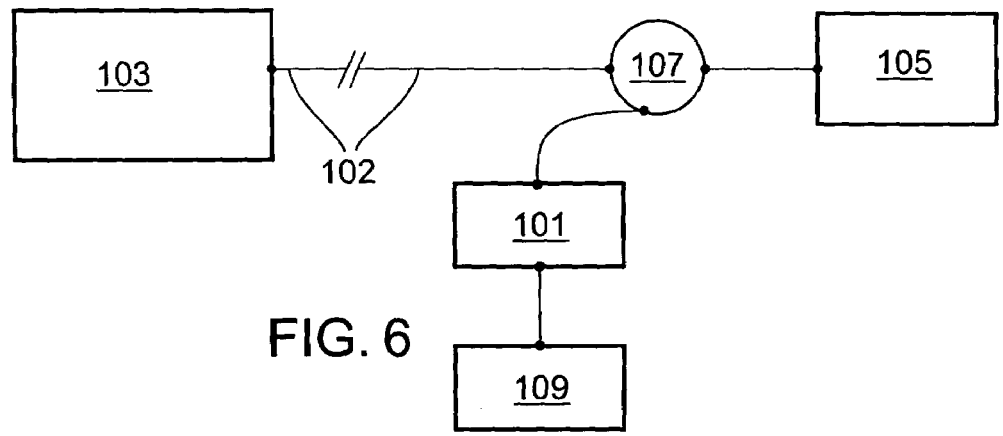
FIG. 6 is a schematic view of a second system comprising a compensating interferometer in accordance with an instance of an embodiment of the invention.
Figure 7:
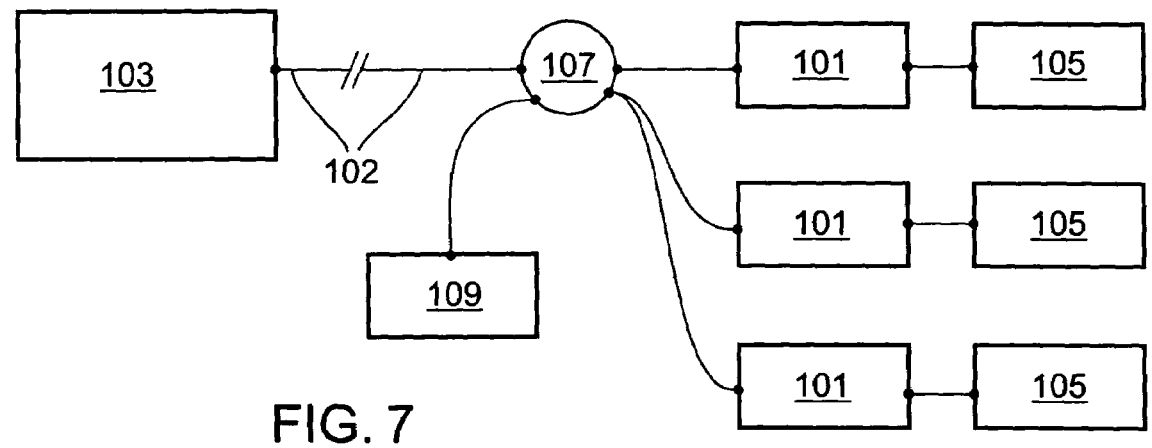
FIG. 7 is a schematic view of a third system comprising a compensating interferometer in accordance with an instance of an embodiment of the invention.

Such an application is illustrated by the apparatus of FIG. 5 in which a compensating interferometer 101 as described is coupled to a source 103 by a connecting fiber 102 so as to position CI 101 between source 103 and a splitter 107. Light entering splitter 107 from CI 101 is directed to one or more fiber optic sensor arrays or other destination systems 105, and after returning to splitter 107, is directed to one or more processing systems 109. FIGS. 6 and 7 show alternate apparatus in which CI 101 is positioned between splitter 107 and processing systems 109, and between splitter 107 and fiber optic sensor arrays 105. When positioned as shown in FIG. 6, the CI can be used to clean up the output generated by the fiber optic sensor arrays 105 prior to processing by systems 109. When positioned as shown in FIG. 7, each CI 101 can be used to tune inputs for a fiber optic sensor array 105.

Although described primarily in regard to compensating interferometers, the apparatus and methods described herein also have applicability to waveform generators and modifiers other than those used as optical compensators.

Although described primarily in regard to fiber Bragg gratings, other Bragg gratings, and/or other frequency dependent reflectors can in some instances be substituted for the fiber Bragg gratings described herein.

The embodiments of the present invention described herein include multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

In some instances, an embodiment of the invention may be characterized as an apparatus including a device comprising: a body, an optical input, an optical output, and two optical legs; wherein one leg is substantially longer than the other; each leg of the two optical legs comprises at least one Bragg grating; the two optical legs are positioned within the body; and the input, output, legs, and gratings are optically coupled and positioned relative to each other such that light entering the optical input is split between the legs, and at least a portion of the light in each leg travels through the leg to the leg's at least one Bragg grating and is reflected back through the leg, and the reflected back portions of light of the two optical legs are combined and exit the apparatus via the optical output. In some such instances, the embodiment may also be characterized as including and/or satisfying one or more of the following elements and/or criteria: (a) the apparatus consists essentially of the compensating interferometer; (b) the body isolates the two optical legs from environmental changes occurring outside of the body; (c) the body is small enough to fit within a sphere having a diameter of one meter; (e) the apparatus further includes an optical sensor array optically coupled to the device such that light output from the sensor array enters the input of the compensating interferometer; (f) the sensor array is an interferometer array comprising a plurality of interferometer subarrays; (g) the device is a compensating interferometer comprising at least three optical legs wherein: each of the at least three legs has a length that is substantially different than the length of all the other legs of the at least three legs, each leg of the at least three legs comprises at least one Bragg grating, the at least three legs are positioned within the body, the body isolates the two optical legs from environmental changes occurring external to the body, and the input, output, legs, and gratings are optically coupled and positioned relative to each other such that light entering the optical input is split between the legs, and at least a portion of the light in each leg travels through the leg to the at least one Bragg grating and is reflected back through the leg, and the reflected back portions from the at least three optical legs are combined and exit the apparatus via the optical output; (h) the apparatus comprises a three port optical circulator and an optical splitter, with the optical input port being optically coupled to the first input port of the optical circulator, the optical output port being optically coupled to the third output port of the optical circulator, and the third port of the optical circulator being coupled to the optical splitter; (i) the apparatus comprises a wavelength division multiplexer splitting light between the legs; (j) a fiber Brag grating in a first of the two optical legs is positioned such that the length L1 of a first of the two optical legs differs from the length L2 of a second of the two optical legs by at least 0.5 meters; (k) the apparatus is adapted to convert an input pulse comprising a plurality of frequencies into at least two output pulses separated in time, each output pulse comprising substantially the same set of frequencies as any other output pulse; (l) at least one leg comprises a reflector that is not a Bragg grating; (m) at least one Bragg grating is a fiber Bragg grating; and (n) at least one leg comprises a first fiber Bragg grating, at least one other leg comprises a second fiber Bragg grating, and the first and second fiber Bragg gratings have different center wavelengths and/or bandwidths.

In some instances, an embodiment of the invention may be characterized as an apparatus that outputs at least one optical signal formed by combining at least two optical leg signals wherein each of the at least two leg signals comprises light reflected by at least one fiber Bragg grating, the at least two leg signals travel significantly different distances within the apparatus, and the at least two leg signals are not substantially affected by environmental changes occurring outside the apparatus. In some such instances, the embodiment may also be characterized as comprising a wavelength division multiplexer and at least two legs, where the wavelength division multiplexers is positioned to split an optical input signal between the at least two legs to provide each of the at least two legs with the light to form the at least two leg signals.

In some instances, an embodiment of the invention may be characterized as a method of generating a waveform comprising distributing an input waveform among a plurality of legs wherein each leg comprises a Bragg grating and contributes to the generated waveform by using the Bragg grating to reflect back at least a portion of light distributed to the leg. In some such instances, the embodiment may also be characterized as including and/or satisfying one or more of the following elements and/or criteria: (a) the Bragg grating is a fiber Bragg grating; (b) the input waveform is a pulse train and the output waveform is a pulse train and each input pulse corresponds to a plurality of output pulses separated in time; and (c) at least one leg comprises at least two fiber Bragg gratings separated by a distance of at least 0.5 meters.

What is claimed is:

1. An apparatus for processing optical signals in the form of light pulses to reduce coherent noise in optical fibers transmitting light from a source, the apparatus comprising:
    an optical splitter having a plurality of ports, a first port of the splitter receiving the optical signals;
    a first leg of optical fiber having a first predetermined length connected to a second port of the optical splitter;
    a first Bragg grating connected to the first leg of optical fiber;
    a second leg of optical fiber having a second predetermined length, different from the first length, connected to a third port of the optical splitter; and
    a second Bragg grating connected to the second leg of optical fiber;
    whereby each light pulse from the source is split between the legs of optical fiber, and reflected back by the Bragg gratings to the optical splitter producing a plurality of output pulses separated in time for each input pulse.

2. The apparatus of claim 1 wherein the optical fiber has a length up to 1000 meters.

3. The apparatus of claim 1 further comprising a housing for isolating the optical legs from environmental changes.

4. The apparatus of claim 1 wherein the housing is embedded within a sphere having a diameter of up to one meter.

5. The apparatus of claim 1 wherein the optical splitter comprises a wavelength division multiplexer splitting light between the legs.

6. The apparatus of claim 1 wherein a Bragg grating in the first optical leg is positioned such that the length of the first optical leg differs from the length of the second optical leg by at least 0.5 meters.

7. The apparatus of claim 1 wherein an input pulse comprising a plurality of frequencies is converted into at least two output pulses separated in time.

8. The apparatus of claim 1 wherein at least one Bragg grating is a fiber Bragg grating.

9. The apparatus of claim 1 wherein the first Bragg grating and the second Bragg grating have different center wavelengths and/or bandwidths.

10. In a system of fiber optic sensors comprising a light source connected to fiber optic sensors through a multiple port splitter, with a sensor signal processing system receiving signals from the fiber optic sensors through the multiple port splitter, an apparatus, as defined in claim 1, connected between the light source and the splitter.

11. The system of fiber optic sensors of claim 10 wherein the apparatus, as defined in claim 1, is connected between the splitter and the sensor signal processing system.

12. The system of fiber optic sensors of claim 10 wherein the apparatus, as defined in claim 1, is connected between the fiber optic sensors and the splitter.

13. A method for processing optical signals to reduce coherent noise in long optical fiber transmitting light from a source, the method comprising:
    splitting the light from the source, which is a light pulse train containing coherent noise, into a plurality of fiber optic legs, each leg being a different length and having at least one Bragg grating; and
    the Bragg gratings reflecting back the light in each respective fiber optic leg providing a plurality of output pulses separated in time for each input pulse.

14. A method for processing optical signals to reduce coherent noise in long optical fiber transmitting light from a source, the method comprising:
    splitting the light from the source containing the coherent noise into a plurality of fiber optic legs, each leg being a different length and having at least one Bragg grating, with at least one leg having at least two Bragg gratings separated by a distance of at least 0.5 meters; and
    the Bragg gratings reflecting back the light in each respective fiber optic leg.

* * * * *